Nov. 7, 1967     E. R. HAMMONDS     3,351,108
LAND CLEARING BLADE
Filed July 8, 1965     3 Sheets-Sheet 1
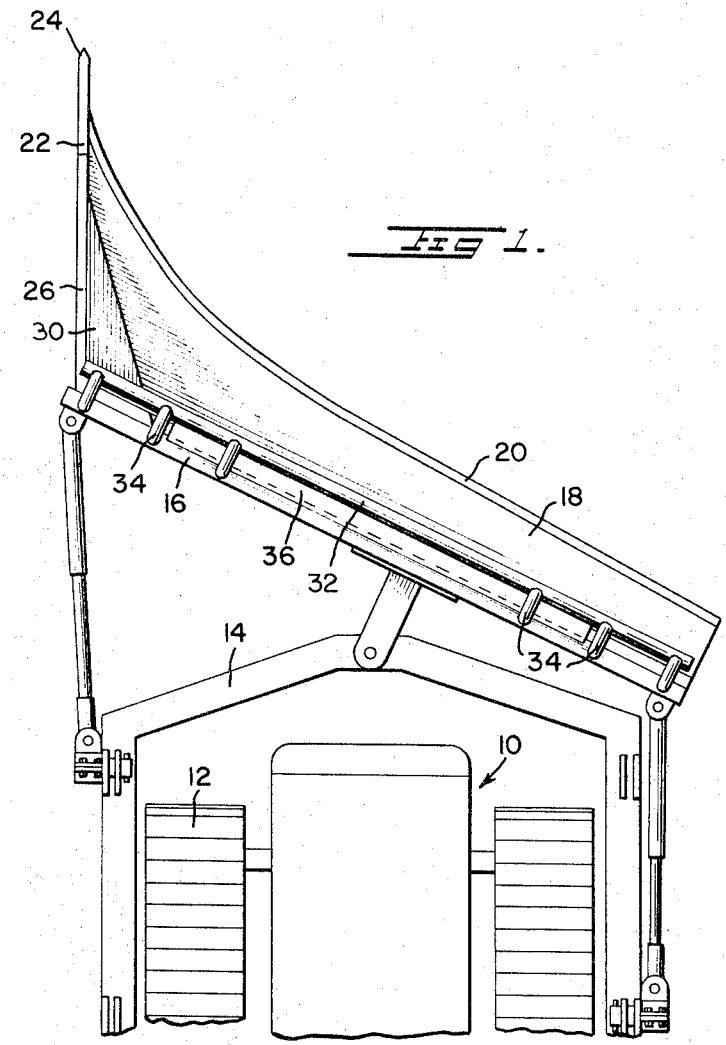
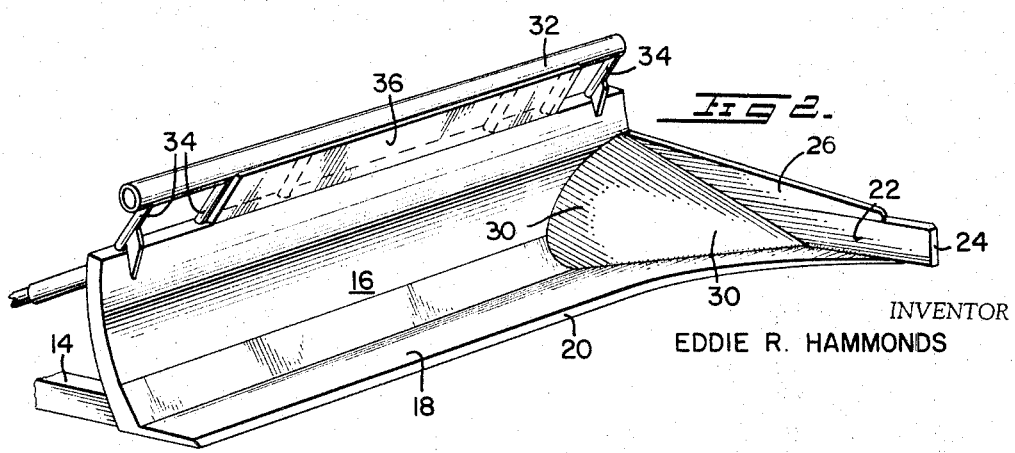
INVENTOR
EDDIE R. HAMMONDS

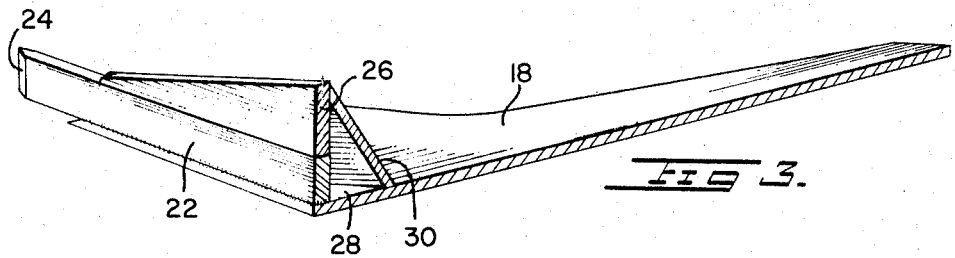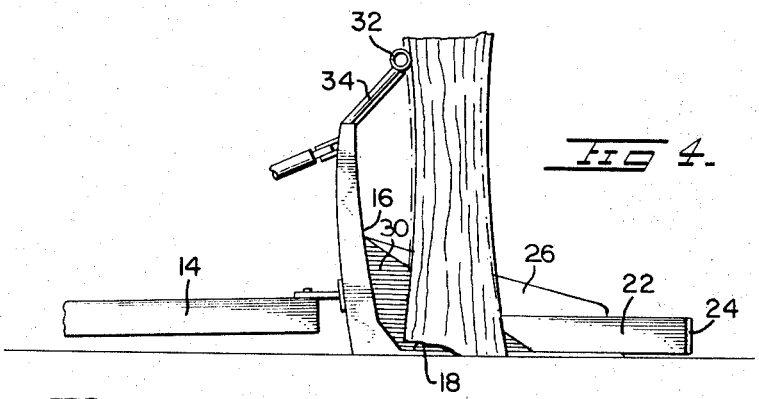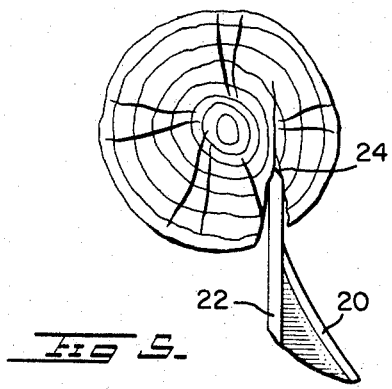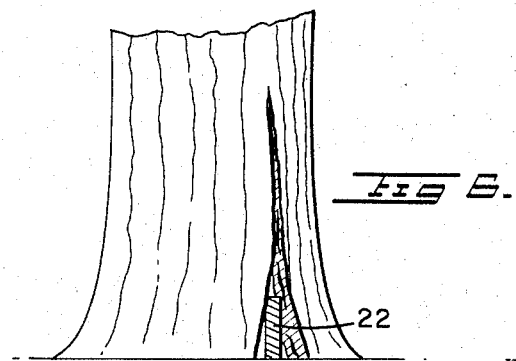

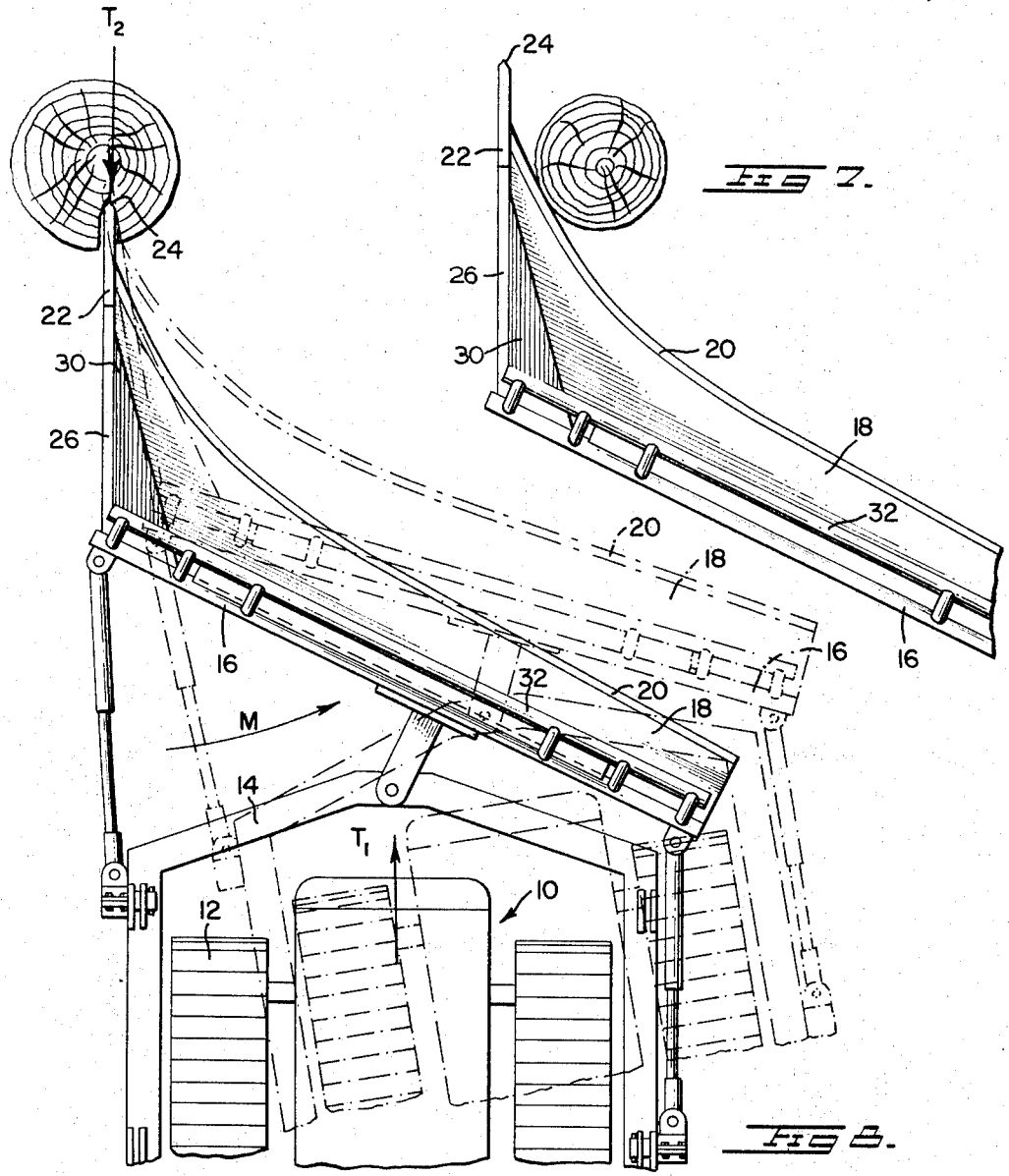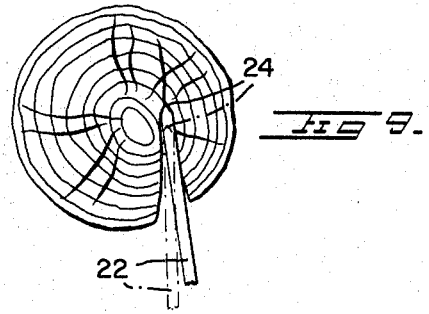

United States Patent Office 3,351,108
Patented Nov. 7, 1967

3,351,108
LAND CLEARING BLADE
Eddie R. Hammonds, Marksville, La., assignor to Owens-Johnson Shearing Blade Corporation, a corporation of Louisiana
Filed July 8, 1965, Ser. No. 470,356
8 Claims. (Cl. 144—34)

The present invention relates to improvements in land clearing blades and is concerned more particularly with brush and tree shearing blades and shearing blade assemblies adapted for incorporation with or attachment to an operating bulldozer or the like.

This application is a continuation-in-part of my copending application Ser. No. 372,968 filed June 5, 1964, now abandoned.

It is an object of the invention to provide a cutting blade of particular curvature which is adapted to cut or shear down brush and small trees in a well-known manner but which is also adapted to shear or slice the base of trees of any size.

Another object of the invention is to provide a tree shearing blade assembly which includes as a part thereof a reinforced wedge or stinger for the purpose of splitting the trunks of larger trees whereby more readily to enable the blade to slice the tree at or adjacent to its ground level.

Still another object of the invention is to provide a shearing blade assembly which includes as a part thereof a tree pusher bar which is positioned at an optimum distance behind the leading edge of the horizontal cutting blade so that it will engage the tree after the cutting edge has sliced into it substantially thus to push the tree forwardly and slightly to one side of the bulldozer preferably so that the tree will fall into a windrow at one side of the path of the bulldozer.

Other and further objects and advantages will be apparent from the following detailed description taken in conjunction with the accompanying drawings wherein a preferred embodiment of the principles of the invention has been selected for exemplification.

In the drawings:

FIG. 1 is a top plan view of a shearing blade and tree splitting wedge assembly constructed in accordance with the present invention and shown attached to the conventional moldboard of a bulldozer which is shown in fragment;

FIG. 2 is a front perspective view of the blade and wedge assembly of FIG. 1 also showing the pusher bar attachment positioned above and rearwardly of the leading cutting edge of the blade;

FIG. 3 is a rear perspective view of the blade and wedge assembly detached from the bulldozer moldboard and illustrating the bracing details of the wedge portion thereof;

FIG. 4 is a side elevational view showing the coaction of the blade and bar in cutting and pushing a tree;

FIGS. 5 and 6 are, respectively horizontal and vertical sectional fragmentary views illustrating the tree splitting action of the vertically edged wedge at the forward side portion of the shearing blade;

FIG. 7 is a horizontal fragmentary view illustrating the slicing action of the shearing blade cutting edge when thrust forwardly against a tree to be felled;

FIG. 8 is a view similar to FIG. 1 but illustrating the relative thrust of the bulldozer and a tree as the wedge is driven into the tree for splitting action and the resulting tendency of the bulldozer to rotate; and FIG. 9 is a horizontal fragmentary view of the resulting movement of the wedge causing it to act like a lever or crowbar providing another disrupting force exerted by the rotating wedge in addition to its splitting action.

Referring more particularly to the drawings, wherein like numerals refer to like parts, 10 designates in its entirety a bulldozer of any conventional kind including the usual endless driving treads 12 and a forward frame assembly 14 for supporting a moldboard or dozer head 16 which normally is set at an angle of about 25° with respect to the longitudinal axis of the bulldozer. It is to be understood that the frame assembly 14 may include means for elevating or lowering the moldboard 16 and also means for adjustably positioning the moldboard vertically or laterally, none of which is shown in detail because they form no part of the present invention.

Turning now to the features of the invention, a horizontal cutting blade 18 having a forward bevelled cutting edge 20 is carried forwardly of the moldboard or dozer head 16. The blade 18 may be welded permanently to the moldboard or it may be secured thereto in any other manner such as by bolts.

As best shown in FIGS. 1 and 8, the blade 18 and cutting edge 20 are curved laterally and forwardly of the dozer head 16, preferably in a wide sweeping curve for more than one-third of the length of the dozer head and continuing at an angle to the dozer head for the remainder of the length of the dozer head. At least the major portion of the cutting edge 20 should be curved laterally and forwardly. The purpose and advantages of such curvature will be more fully explained hereinafter.

A wedge or stinger 22 having a vertical leading edge 24 projects substantially in front of the forward point of the blade cutting edge 20 and preferably carries a vertical upwardly and rearwardly sloping plate 26. A brace plate 30 is secured as by welding the wedge 22, the cutting blade 18 and the moldboard or dozer head 16 extending over the corner portion 28 of the cutting blade 18. The purpose and advantages of such wedge and bracing means will also be more fully explained hereinafter.

To expedite felling a tree a pusher bar 32 is mounted by spaced supporting legs 34 upwardly of the moldboard or dozer head 16 substantially parallel therewith and at an optimum distance behind the cutting edge 20 of the blade 18. A panel 36 between intermediate legs 34 protects the front end of the bulldozer 10.

Coming now to FIGS. 4–9 and the operation of the land clearing blade of the present invention, under normal dry ground conditions the horizontal cutting blade 18 with its arcuate leading edge 20 at an angle to the bulldozer moldbound 16 functions to slice completely through trees, large or small, at or below ground level as indicated in FIG. 7 ordinarily without the necessity of engaging the wedge 22. The pusher bar attachment 32 also operates in cooperation with the bottom cutting blade 18 to open up the cut after the blade has sliced substantially into the tree and to push the tree to one side, the right side, as the tree is felled as indicated in FIG. 4.

The wedge 22 is ordinarily used for abnormal or special conditions where the ground may be sufficiently wet to prevent the bulldozer treads from getting a firm grip so that they slip or where special care in cutting a tree must be observed to cause the tree to fall in a particular direction. If the ground is wet and full tractive effort cannot be developed, the wedge 22 can be driven into a tree to split and shatter it with explosive force as indicated in FIGS. 5 and 6 so that it can be readily cut off subsequently by the horizontal cutting blade 18 with the reduced tractive effort.

If a tree is to be felled either to one side or to the other, the wedge 22 can be used initially on the side to split out a portion of the tree at its base and cause the tree to tend to lean in that direction. If a tree is very large, say about four feet or more in diameter, successive thrusts by the wedge 22 can be made to split out successive portions of the tree before the bottom cutting blade 18 is used for the final cutoff. However, where the full tractive effort to a large bulldozer is available large trees may ordinarily be sheared and felled by the horizontal blade 18 and pusher bar 32 alone without use of the wedge 22.

The operation of the pusher bar 32 is rendered most effective by its set position parallel to the moldboard 16 which is itself usually set at an angle of about 25° with respect to the longitudinal axis of the bulldozer 10 and with the bar 32 also set at an optimum distance behind the leading cutting edge 20 of the blade 18 so that it does not engage the tree until the cutting edge has sliced into it substantially. Thus, the effect of the pusher bar 32 is to push the tree forward and slightly to the right, opening up the cut and freeing the cutting blade from any pinching action of the tree as well as giving the tree an initial rightward push so that it will fall in a windrow to the right of the path of the bulldozer.

The cutting blade 18 and the wedge 22 are strengthened very materially by the brace plate 30 which is welded to the cutting blade, the wedge and the moldboard which is sloped to shed any accumulation of debris. Said strengthening of the cut blade 18 is highly desirable because this blade sweeps forward considerably in front of the moldboard in order to strike the tree at a sharp angle as indicated in FIG. 7. It is the sharpness of this angle which helps to give the blade 18 its effective slicing action and the stiffening provided by the brace means prevents this part of the blade from bending or buckling. The wedge 22 also projects forward for a considerable distance in front of the forward point of the cutting blade 18. The bracing means such as provided by the plate 30 prevents the wedge 22 from buckling from under the impact of being driven straight ahead into a tree and also strengthens the wedge 22 against bending that results from small rotations of the bulldozer produced by the excentricity of the bulldozer thrust. As indicated in FIG. 8, the bulldozer thrust $T_1$ is opposed by the resistance of the tree $T_2$ which is to the left of and therefore not in line with $T_1$. This produces a couple on the tractor which causes it to rotate to the right or counter-clockwise as shown by the curved arrow M in FIG. 8. As indicated in FIG. 9, this action rotates the wedge bar 22 to the right causing it to act like a lever or crowbar to provide another disrupting force in addition to the splitting action of the wedge.

It will be apparent that the construction and arrangement of the various parts composing this invention provide an extremely effective land clearing tool which requires no more than ordinary skill to operate quickly and efficiently.

It is to be understood that the present invention is not confined to the particular structures and arrangements of parts as herein illustrated and described but embraces all such modifications thereof as may come within the scope of the following claims.

I claim:
1. A dozer head comprising, in combination, a tree cutting blade mounted horizontally on the front of said head, a leading cutting edge for said blade, the major portion of said cutting edge curving laterally and forwardly of the width of said head, and a pusher mounted on said head for felling trees cut by said cutting blade.

2. The combination of claim 1 wherein a vertically disposed stinger blade having a leading tree splitting edge is positioned at the forward curved end portion of the tree cutting blade.

3. A dozer head comprising, a tree cutting blade mounted horizontally on the front of said head and a leading cutting edge for said blade, the major portion of the length of said cutting edge curving laterally and forwardly of the width of said head.

4. The combination of claim 3 wherein a vertically disposed stinger blade having a leading tree splitting edge is positioned at the forward curved end portion of the tree cutting blade.

5. A tree cutting blade for attachment horizontally on the front of a dozer head, a leading cutting edge extending substantially the length of said blade, the major portion of the length of said cutting edge curving laterally and forwardly of the width of said blade.

6. The blade of claim 5 additionally including a substantially vertically disposed stinger blade carried at the forward curved end portion of the blade.

7. The combination of claim 1 wherein the pusher is positioned upwardly and rearwardly of said cutting edge.

8. The blade of claim 6 additionally including bracing plate means for said stinger blade secured to said stinger blade and cutting blade.

References Cited
UNITED STATES PATENTS

| | | | |
|---|---|---|---|
| 315,184 | 4/1885 | Taft | 37—143 |
| 3,084,727 | 4/1963 | Basham | 144—34 |
| 3,126,927 | 3/1964 | Swanson et al. | 144—34 |
| 3,215,174 | 11/1965 | Billings | 144—34 |
| 3,216,467 | 11/1965 | Andrews | 144—34 |

WILLIAM W. DYER, JR., *Primary Examiner.*

ANDREW R. JUHASZ, *Examiner.*

W. D. BRAY, *Assistant Examiner.*